US010562703B2

(12) United States Patent
Gwon et al.

(10) Patent No.: US 10,562,703 B2
(45) Date of Patent: Feb. 18, 2020

(54) REFUSE COLLECTION APPARATUS

(71) Applicant: Ecube Labs Co., LTD., Seoul (KR)

(72) Inventors: Sun Beom Gwon, Seoul (KR); Gil Rok Do, Gunsan-si (KR)

(73) Assignee: ECUBE LABS CO., LTD., Los Angeles, CA (US)

(*) Notice: Subject to any disclaimer, the term of this patent is extended or adjusted under 35 U.S.C. 154(b) by 0 days.

(21) Appl. No.: 15/626,846

(22) Filed: Jun. 19, 2017

(65) Prior Publication Data

US 2017/0283169 A1 Oct. 5, 2017

Related U.S. Application Data

(63) Continuation of application No. 14/773,417, filed as application No. PCT/KR2014/003907 on May 1, 2014, now Pat. No. 9,821,955.

(30) Foreign Application Priority Data

Apr. 23, 2014 (KR) .................. 10-2014-0048615

(51) Int. Cl.
*B65F 1/14* (2006.01)
*G01D 5/26* (2006.01)
(Continued)

(52) U.S. Cl.
CPC .............. *B65F 1/1405* (2013.01); *B09B 3/00* (2013.01); *B30B 1/006* (2013.01); *B30B 9/305* (2013.01);
(Continued)

(58) Field of Classification Search
CPC .... B65F 1/1405; B65F 2210/162; B65F 1/00; B65F 1/14; B65F 2210/172; B65F 1/08;
(Continued)

(56) References Cited

U.S. PATENT DOCUMENTS 3,214,090 A * 10/1965 Lewis .................. B65F 1/0053
232/43.2
5,215,222 A 6/1993 McGill
(Continued)

FOREIGN PATENT DOCUMENTS

CN 105209353 A 12/2015
EP 2664449 A2 11/2013
(Continued)

OTHER PUBLICATIONS

Big Belly Cordless Compaction System Product Walk-Through Brochure, http://www.thecompactorguy.com/downloads/BB3-brochure-v5.pdf, Accessed prior to Dec. 29, 2017, 15 pages.
(Continued)

*Primary Examiner* — Adam J Eiseman
*Assistant Examiner* — Mohammed S. Alawadi
(74) *Attorney, Agent, or Firm* — Stephen Kenny; TaeSoo Sean Kim; Foley Hoag, LLP

(57) ABSTRACT

A refuse collection apparatus is disclosed. A refuse collection apparatus according to one embodiment of the present invention a main body unit into which a refuse is inserted, a refuse compression unit installed in the main body unit and configured to compress the refuse inserted into the main body unit and a movement range detection unit located inside of the main body unit and configured to detect a movement range of the refuse compression unit.

16 Claims, 10 Drawing Sheets

(51) Int. Cl.
*G01D 5/12* (2006.01)
*B30B 9/30* (2006.01)
*B30B 1/00* (2006.01)
*G01B 11/00* (2006.01)
*B65F 1/00* (2006.01)
*B09B 3/00* (2006.01)
*B65F 1/08* (2006.01)

(52) U.S. Cl.
CPC ............ *B30B 9/306* (2013.01); *B30B 9/3007* (2013.01); *B30B 9/3021* (2013.01); *B65F 1/00* (2013.01); *B65F 1/14* (2013.01); *G01B 11/00* (2013.01); *G01D 5/12* (2013.01); *G01D 5/26* (2013.01); *B65F 2001/1494* (2013.01); *B65F 2210/104* (2013.01); *B65F 2210/1443* (2013.01); *B65F 2210/162* (2013.01); *B65F 2210/168* (2013.01); *B65F 2210/172* (2013.01)

(58) Field of Classification Search
CPC ............ B65F 1/1426; B65F 2001/1494; B65F 2210/104; B65F 2210/1443; B65F 2210/168; B65F 2210/128; B30B 1/006; B30B 9/306; B30B 9/305; B30B 9/3032; B30B 9/3021; B30B 9/3007; B30B 9/00; B30B 9/3042; B09B 3/00; B09B 9/3007; G01B 11/00; G01D 5/12; G01D 5/26
USPC .......................................................... 100/38
See application file for complete search history.

(56) References Cited

U.S. PATENT DOCUMENTS

| | | | |
|---|---|---|---|
| 5,903,118 A | 5/1999 | Niekka | |
| 6,150,939 A * | 11/2000 | Lin ...................... | B65F 1/1426 248/147 |
| 6,660,993 B2 * | 12/2003 | Appleyard ............... | B21D 5/02 100/342 |
| 7,007,598 B1 * | 3/2006 | Patras .................. | B30B 9/3007 100/215 |
| 7,124,680 B2 | 10/2006 | Poss | |
| D564,545 S | 3/2008 | Poss et al. | |
| 7,481,159 B2 | 1/2009 | Poss et al. | |
| 9,352,887 B2 | 5/2016 | Poss et al. | |
| 2008/0067227 A1 | 3/2008 | Poss et al. | |
| 2009/0021242 A1 * | 1/2009 | Djama ................... | B60T 8/171 324/166 |
| 2011/0137484 A1 | 6/2011 | Poss et al. | |
| 2011/0238598 A1 | 9/2011 | Boroski et al. | |
| 2014/0125490 A1 | 5/2014 | Ullrich et al. | |
| 2014/0172174 A1 | 6/2014 | Poss et al. | |
| 2015/0144012 A1 † | 5/2015 | Frybarger | |
| 2016/0050514 A1 | 2/2016 | Skocypec et al. | |
| 2016/0221752 A1 | 8/2016 | Satwicz et al. | |
| 2016/0347540 A1 | 12/2016 | Skocypec et al. | |
| 2016/0353385 A1 | 12/2016 | Skocypec et al. | |
| 2016/0354990 A1 | 12/2016 | Skocypec et al. | |
| 2016/0355308 A1 | 12/2016 | Poss et al. | |
| 2017/0090447 A1 | 3/2017 | Skocypec et al. | |
| 2017/0240355 A1 | 8/2017 | Satwicz et al. | |

FOREIGN PATENT DOCUMENTS

| | | |
|---|---|---|
| EP | 2962959 A1 | 1/2016 |
| GB | 2528804 A | 2/2016 |
| KR | 10-0877148 B1 | 1/2009 |
| KR | 10-1506283 B1 | 3/2015 |
| SG | 11-201507879 T | 11/2015 |
| WO | WO 2004110659 | 12/2004 |
| WO | WO 2008051921 | 5/2008 |
| WO | WO 2008154475 | 12/2008 |
| WO | WO 2012015664 | 2/2012 |
| WO | WO 2014099190 | 6/2014 |
| WO | WO 2015120455 | 8/2015 |
| WO | WO 2015120462 | 8/2015 |
| WO | WO 2015120463 | 8/2015 |
| WO | 2015/163524 A1 | 10/2015 |
| WO | WO 2015175763 | 11/2015 |
| WO | WO 2016126802 | 8/2016 |
| WO | WO 2017100805 | 6/2017 |

OTHER PUBLICATIONS

International Search Report and Written Opinion for PCT/KR2014/003907 dated Jan. 26, 2015.
International Preliminary Report on Patentability for PCT/KR2014/003907 dated Oct. 25, 2016.

\* cited by examiner
† cited by third party

REFUSE COLLECTION APPARATUS

CROSS-REFERENCE TO RELATED APPLICATIONS

This application is continuation of U.S. application Ser. No. 14/773,417, filed Sep. 8, 2015, which is a National Stage of International Application No. PCT/KR2014/003907, filed May 1, 2014, which claims the benefit of and priority to Republic of Korea Application No. 10-2014-0048615, filed Apr. 23, 2014, each of which is hereby incorporated by reference herein in its entirety.

TECHNICAL FIELD

This disclosure relates to a refuse collection apparatus, more particularly, a refuse collection apparatus for compressing a refuse to prevent a refuse from being overflowed into the outside of an apparatus and for detecting a movement range of a refuse compression unit to ascertain an accumulation amount of a refuse.

BACKGROUND ART

Generally, a refuse collection apparatus may be installed in a public place for collecting a refuse which an unspecific person throws away to protect a fine view of a public place. Here, various refuses is an object for collecting in a refuse collection apparatus which is installed in a public place such as a wayside or bus station, park etc.

However, if a refuse stored in the inside of a refuse collection apparatus is not emptied and left alone, a refuse dirty and contaminate a public place as discharged from a refuse collection apparatus.

For preventing this, it is necessary to dispose of a refuse of the inside of a refuse collection apparatus before a refuse stored in a refuse collection apparatus is overflowed into the outside of an apparatus.

In the case of existing method, because a worker need to personally see the inside of a refuse collection apparatus with the naked eye for checking whether a refuse collection apparatus is filled with a refuse, a worker empties a refuse collection apparatus regularly or irregularly according to existing method.

However, as a worker empties a refuse collection apparatus regularly or irregularly according to existing method, a problem that a refuse is overflowed into the outside of a refuse collection apparatus may occur when a refuse is excessively inserted into the inside of a refuse collection apparatus or there is a problem that a work efficiency is reduced and time and cost for disposal is wasted because a refuse collection apparatus is emptied before a refuse collection apparatus is filled with a refuse when a refuse is insufficiently inserted into the inside of a refuse collection apparatus.

Technical Problem

Therefore a technical problem according to the present invention proposes a refuse collection apparatus for compressing a refuse to prevent a refuse from being overflowed into the outside of an apparatus and for detecting a movement range of a refuse compression unit to ascertain an accumulation amount of a refuse, and through this a refuse collection apparatus maintains a fine view of a public place and time and reduces cost for disposal of a refuse to increase a work efficiency.

TECHNICAL SOLUTION

According to one embodiment of the present invention, a refuse collection apparatus including a main body unit into which a refuse is inserted; a refuse compression unit installed in the main body unit and configured to compress the refuse inserted into the main body unit; and a movement range detection unit located inside of the main body unit and configured to detect a movement range of the refuse compression unit may be provided.

Also, the movement range detection unit may include a rotation plate configured to be connected with the refuse compression unit to rotate; and a rotation detection sensor separately located from the rotation plate and configured to detect a rotation of the rotation plate.

And the rotation plate may include a body board on which a middle hole is formed; and a protrusion unit equipped with a groove and a protuberance formed around the body board.

Also, the rotation detection sensor may detect a rotation of the rotation plate through the protrusion unit of the rotation plate.

And the rotation detection sensor may be formed from a magnetic sensor configured to detect a magnetic substance or a photo sensor configured to detect a light.

Also, the refuse compression unit may include a compression plate configured to contact to the refuse to apply pressure to the refuse; a height regulation unit configured to be connected with the compression plate to be driven in order to regulate a height of the compression plate; and a driving unit configured to be connected with the height regulation unit and provide a driving power to the height regulation unit.

And the driving unit may include a driving motor configured to provide a driving power; a driving power transmission unit configured to be connected to the driving motor to transmit a driving power of the driving motor; and a rotation driving axis configured to be connected with the driving power transmission unit to rotate.

Also, the rotation plate may be connected with the rotation driving axis and interlocked with a rotation of the rotation driving axis to rotate.

And, a refuse collection apparatus according to one embodiment of the present invention may further include a control unit configured to measure an over-current flowing by an overload applied to the driving motor to control in order to remove a compression of the compression plate when the compression plate compresses the refuse by a driving power provided from the driving motor.

Also, the control unit may calculate a height of the height regulation unit at a compression removal point of the compression plate through a rotation number of the rotation plate when removing a compression of the compression plate.

And the control unit may calculate an accumulation amount of the refuse compressed in the main body unit from a position of the height regulation unit at a compression removal point of the compression plate.

Also, a refuse collection apparatus according to one embodiment of the present invention may further include a height regulation unit protection cover configured to be connected with one side of the height regulation unit for protecting the height regulation unit.

And the a height regulation unit protection cover may include a cover plate configured to cover the height regulation unit; and a sliding unit configured to be connected with the cover plated to be capable of sliding.

Also, the driving power transmission unit may include a bevel gear configured to be connected to the driving motor; a connection axis configured to be connected with the bevel gear to rotate; and a belt unit configured for an one side of the belt unit to be connected with the connection axis and for other side of the of the belt unit to be connected with the rotation driving axis to transmit a rotation power of the connection axis to the rotation driving axis.

And a circumference of the rotation driving axis may include a first screw thread formed toward an one side direction from a reference position, the reference position which is a pre-determined position of the rotation driving axis; and a second screw thread formed toward an opposite direction to the first screw thread from the reference position.

Also, a refuse collection apparatus according to one embodiment of the present invention may further include a first guide block configured to be connected with the first screw thread and to move along with the first screw thread when the rotation driving axis rotates; and a second guide block configured to be connected with the second screw thread and to move along with the second screw thread toward the opposite direction of the first guide block when the rotation driving axis rotates.

And a refuse collection apparatus according to one embodiment of the present invention may further include an at least one horizontal bar configured to horizontally connect the first guide block and the second guide block.

Also, the height regulation unit may include a first link unit configured to be connected with the first guide block and to be interlocked with a driving of a left and right direction of the first guide block to be driven in a up and down direction; and a second link unit configured to be connected with the first link unit, to be connected with the second guide block and to be interlocked with a driving of a left and right direction of the second guide block to be driven in a up and down direction.

And a refuse collection apparatus according to one embodiment of the present invention may further include a sensor for ascending height regulation separately configured to be located from an at least one of the first guide block and the second guide block and to detect an approach of an at least one of the first guide block and the second guide block for controlling of an ascending height of the compression plate.

Also, a refuse collection apparatus according to one embodiment of the present invention may further include a fire outbreak detection unit configured to be installed in the main body unit to detect whether a fire outbreaks.

And a refuse collection apparatus according to one embodiment of the present invention may further include an object detection unit configured to be installed in an inside of the main body unit for detecting an object inserted from an outside of the main body unit, wherein when the object is detected by the object detection unit, a driving of the refuse compression unit is stopped.

Also, a refuse collection apparatus according to one embodiment of the present invention may further include an advertisement frame configured to be connected with the main body unit.

And, a refuse collection apparatus according to one embodiment of the present invention may further include a power supply unit, wherein the power supply unit configured to use a solar energy.

Also, a refuse collection apparatus according to one embodiment of the present invention may further include a communication unit configured to be connected with the main body unit, wherein the communication unit configured to transmit an at least one stated of the main body unit, the refuse compression unit, the movement range detection unit and the power supply unit to an external sever.

MODE FOR INVENTION

Attached drawings and details on attached drawings illustrating preferred embodiment of the present invention need to be referred for sufficiently understanding the present invention, advantage of operation of the present invention and purpose achieved by working of the present invention.

In the following, as explaining preferred embodiment of the present invention, the present invention is illustrated in detail. Similar mark shown in each drawing is affixed to similar part through entire patent specification.

While terms such as "one side," "other side," and the like, may be used to describe certain sides, such sides must not be understood as being limited to the terms. The terms are merely used to help the reader to distinguish one side from another.

It will be understood that when an element is referred to as being "connected to", "connected with" or "connected with" another element, the element can be directly connected or combined to the other element or indirectly connected or combined to the other element through intervening elements.

A refuse collection apparatus includes a main body unit into which a refuse is inserted, a refuse compression unit installed in the main body unit and configured to compress the refuse inserted into the main body unit and a movement range detection unit located inside of the main body unit and configured to detect a movement range of the refuse compression unit.

Figure 1:
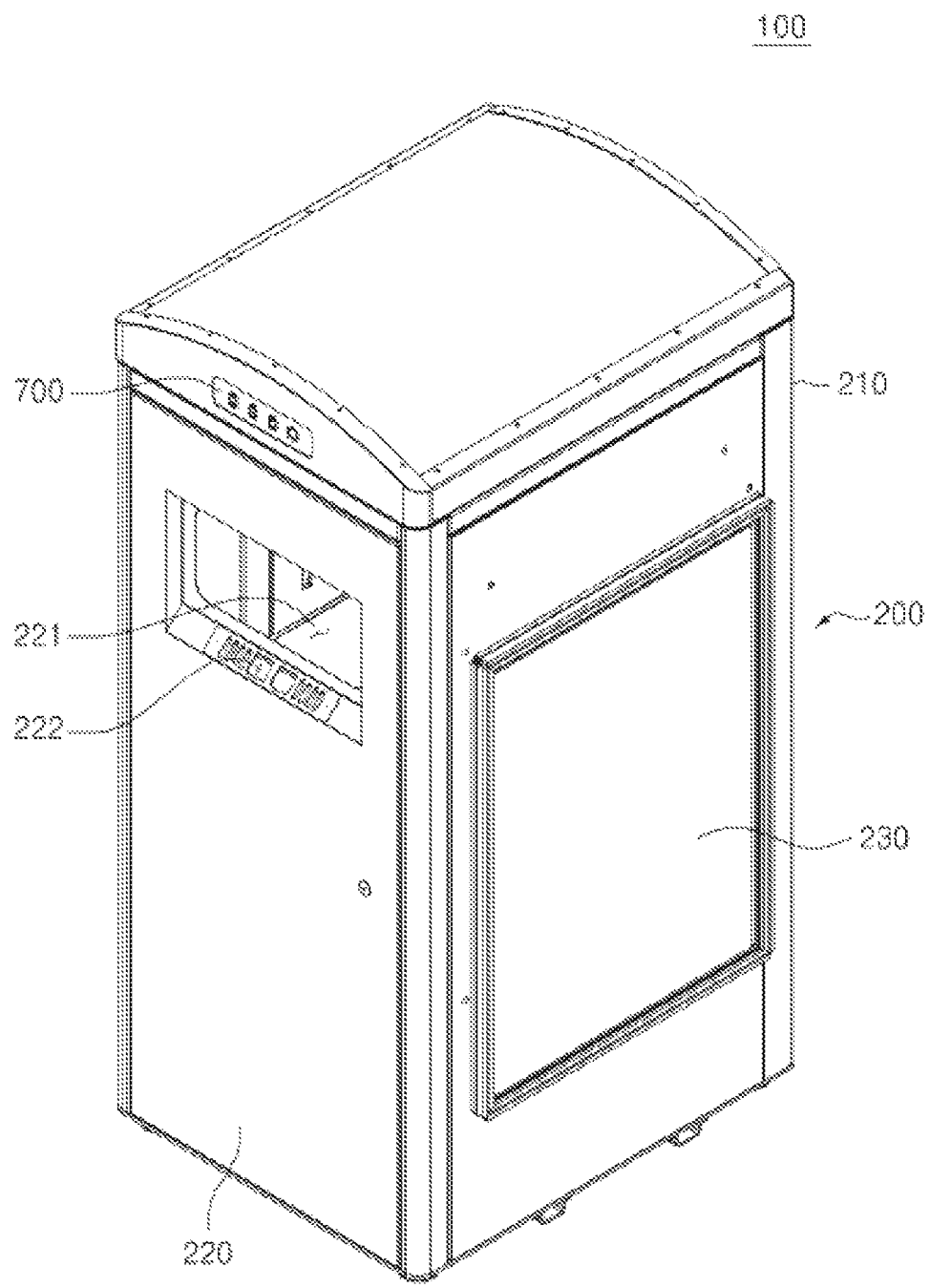
FIG. 1 is a whole perspective view of a refuse collection apparatus according to one embodiment of the present invention.
Figure 2:
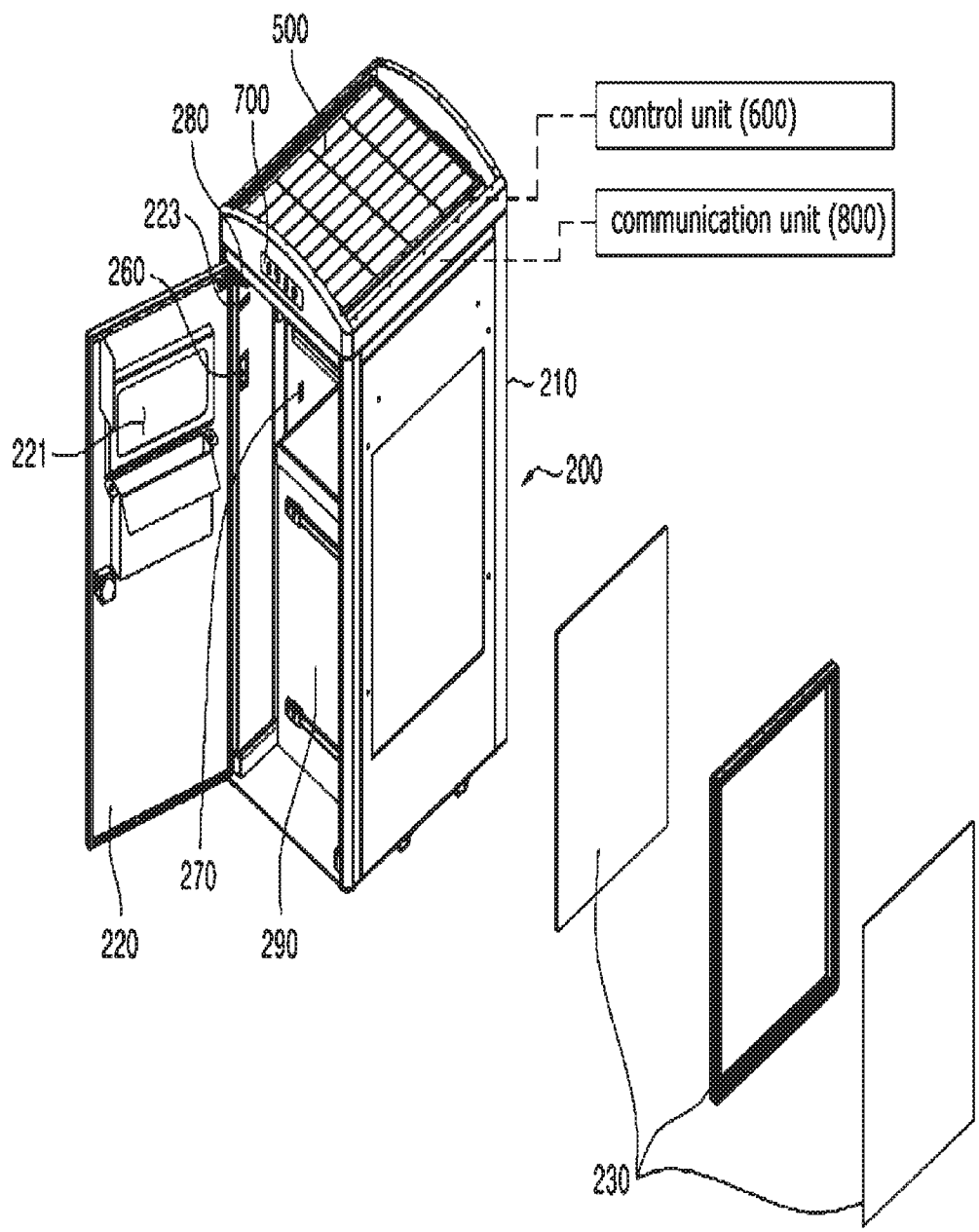
FIG. 2 is a partial disassembly perspective view showing the inside of a refuse collection apparatus according to one embodiment of the present invention.
Figure 3:
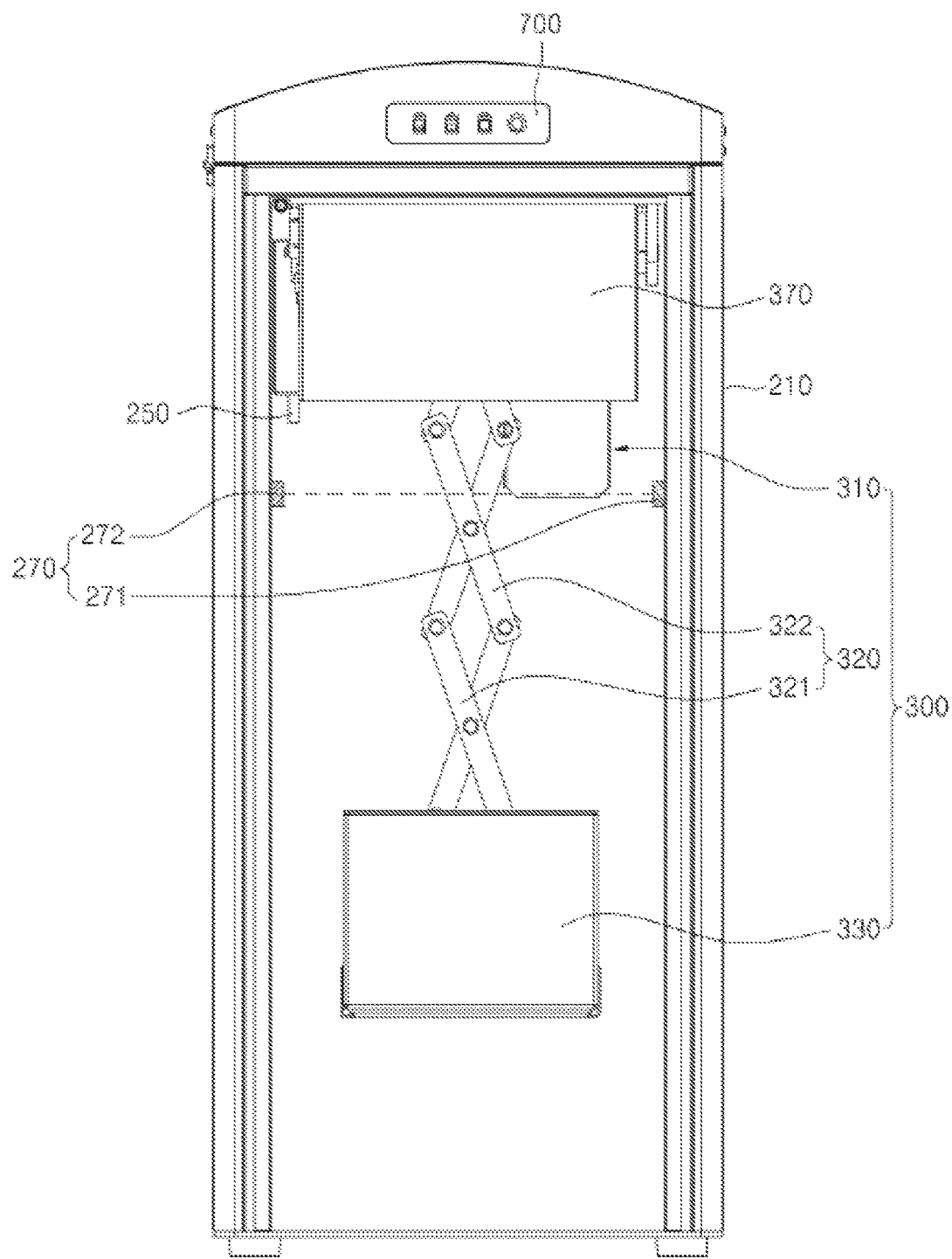
FIG. 3 is a cross-sectional diagram as seen from the front of a refuse collection apparatus according to one embodiment of the present invention.
Figure 4:
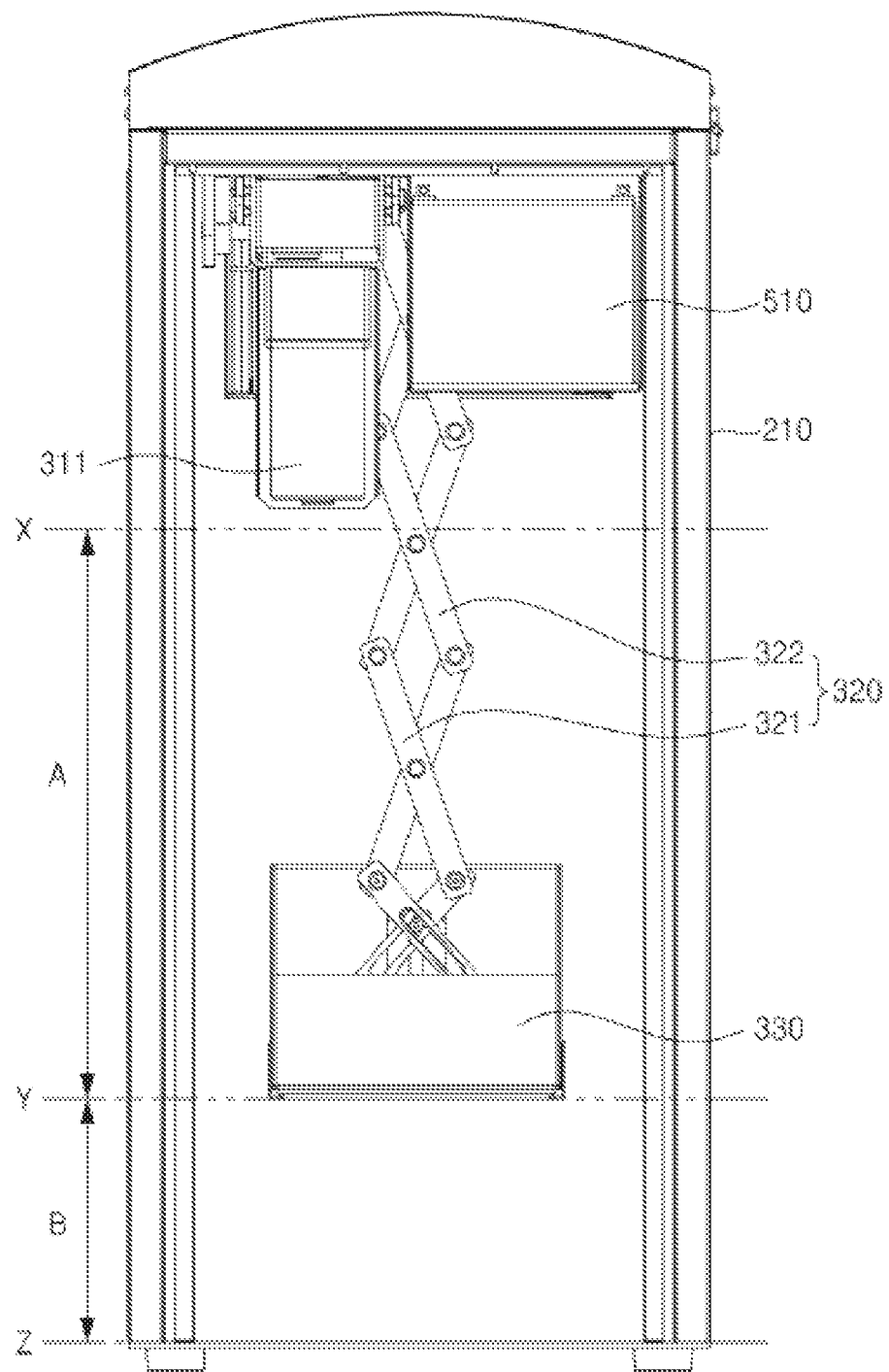
FIG. 4 is a cross-sectional diagram as seen from the back of a refuse collection apparatus according to one embodiment of the present invention.
Figure 5:
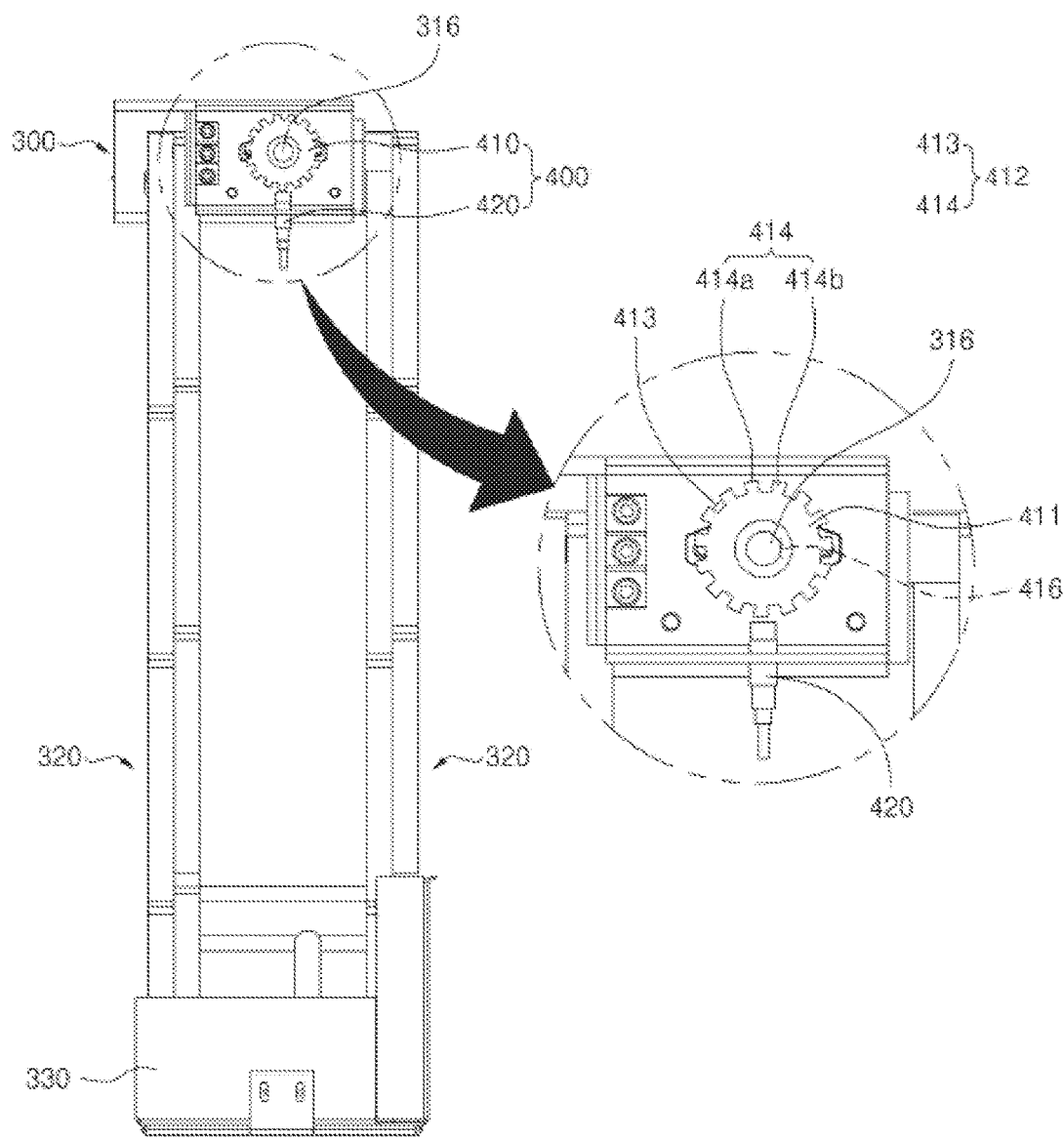
FIG. 5 is a cross-sectional diagram as seen from the side where a movement range detection unit is located in a refuse collection apparatus according to one embodiment of the present invention.
Figure 6:
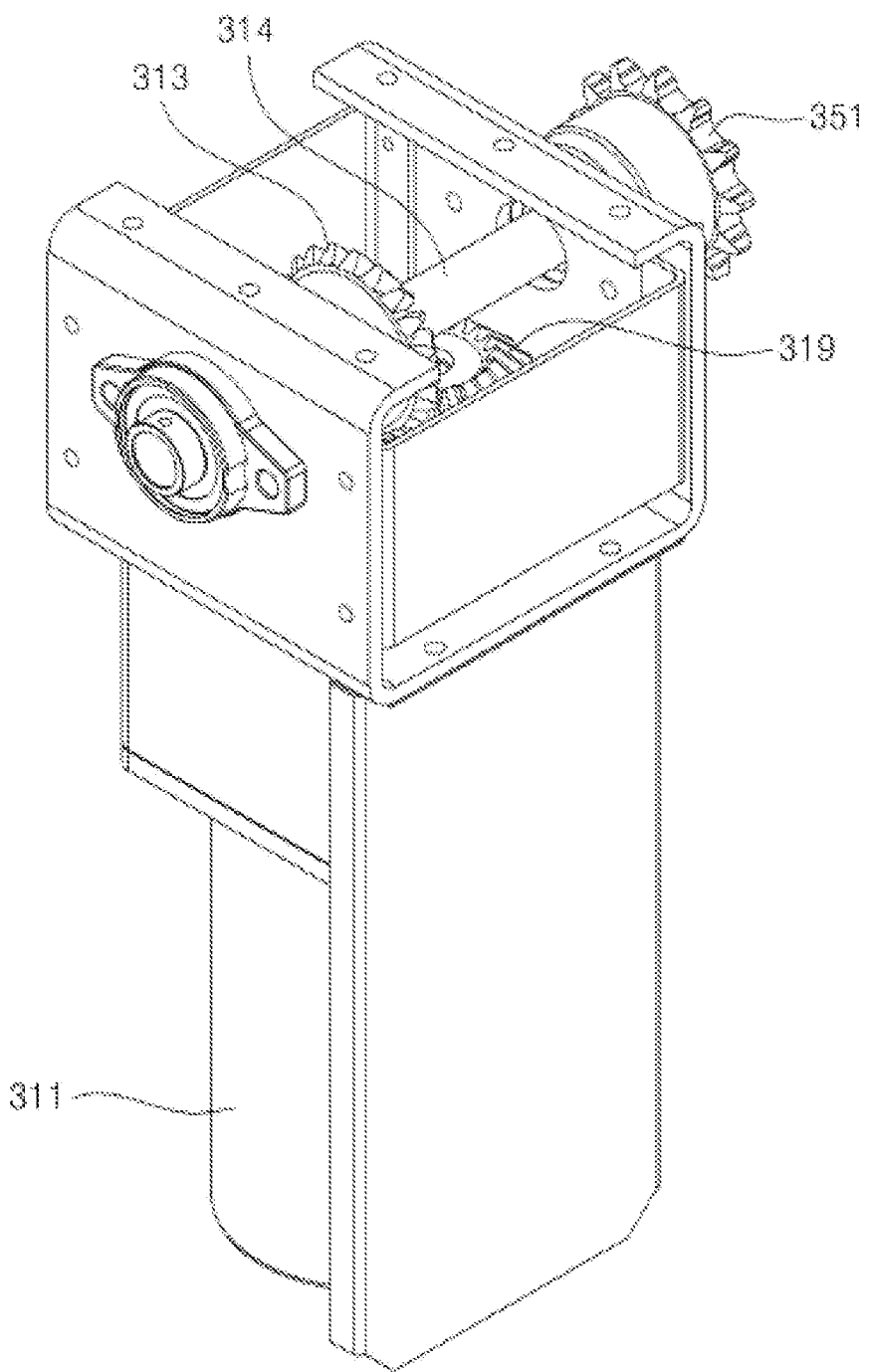
FIG. 6 is a perspective view showing a driving unit of a refuse collection apparatus according to one embodiment of the present invention.
Figure 7:
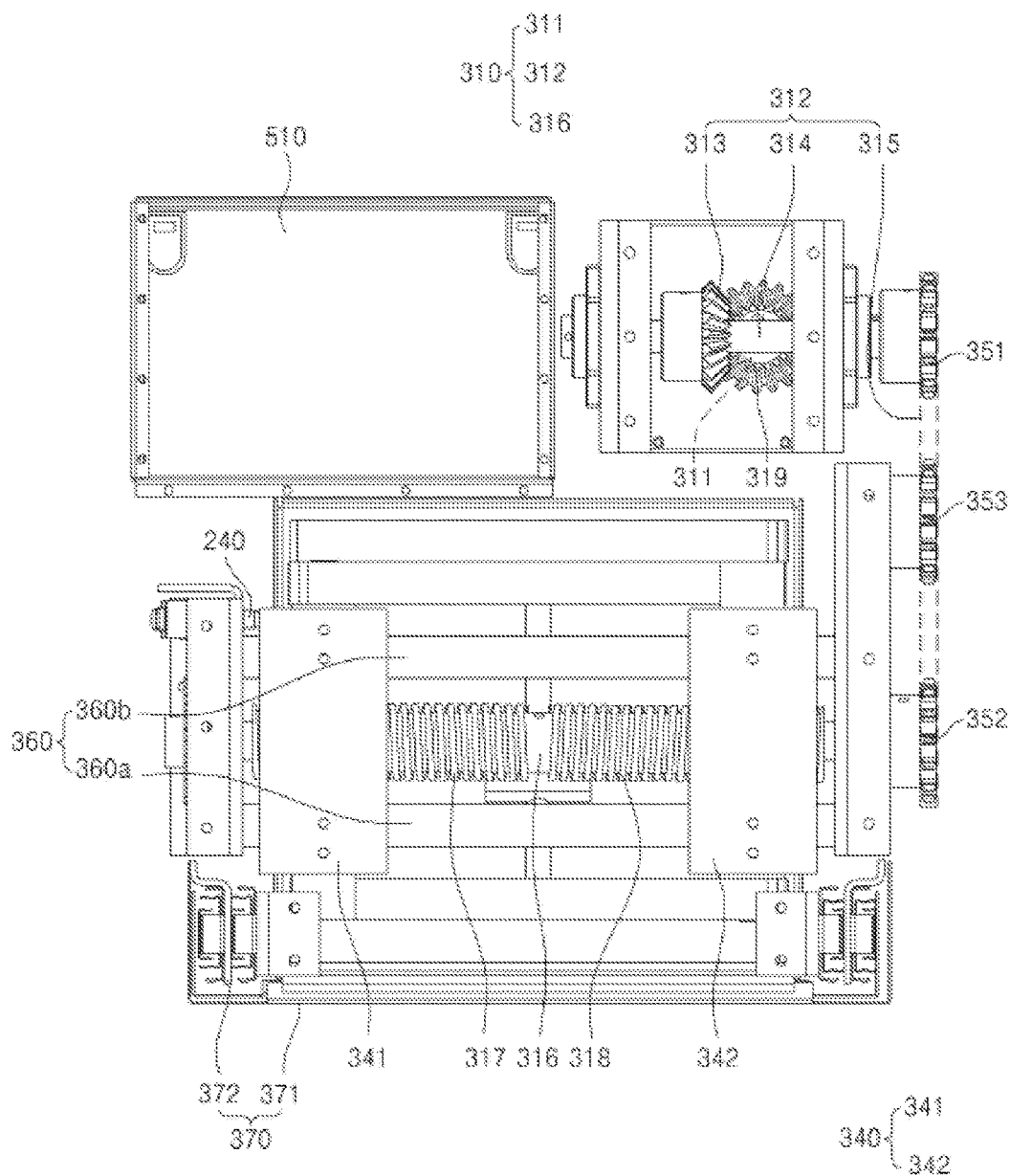
FIG. 7 is a cross-sectional diagram as seen from the upper side of a refuse collection apparatus according to one embodiment of the present invention.
Figure 8:
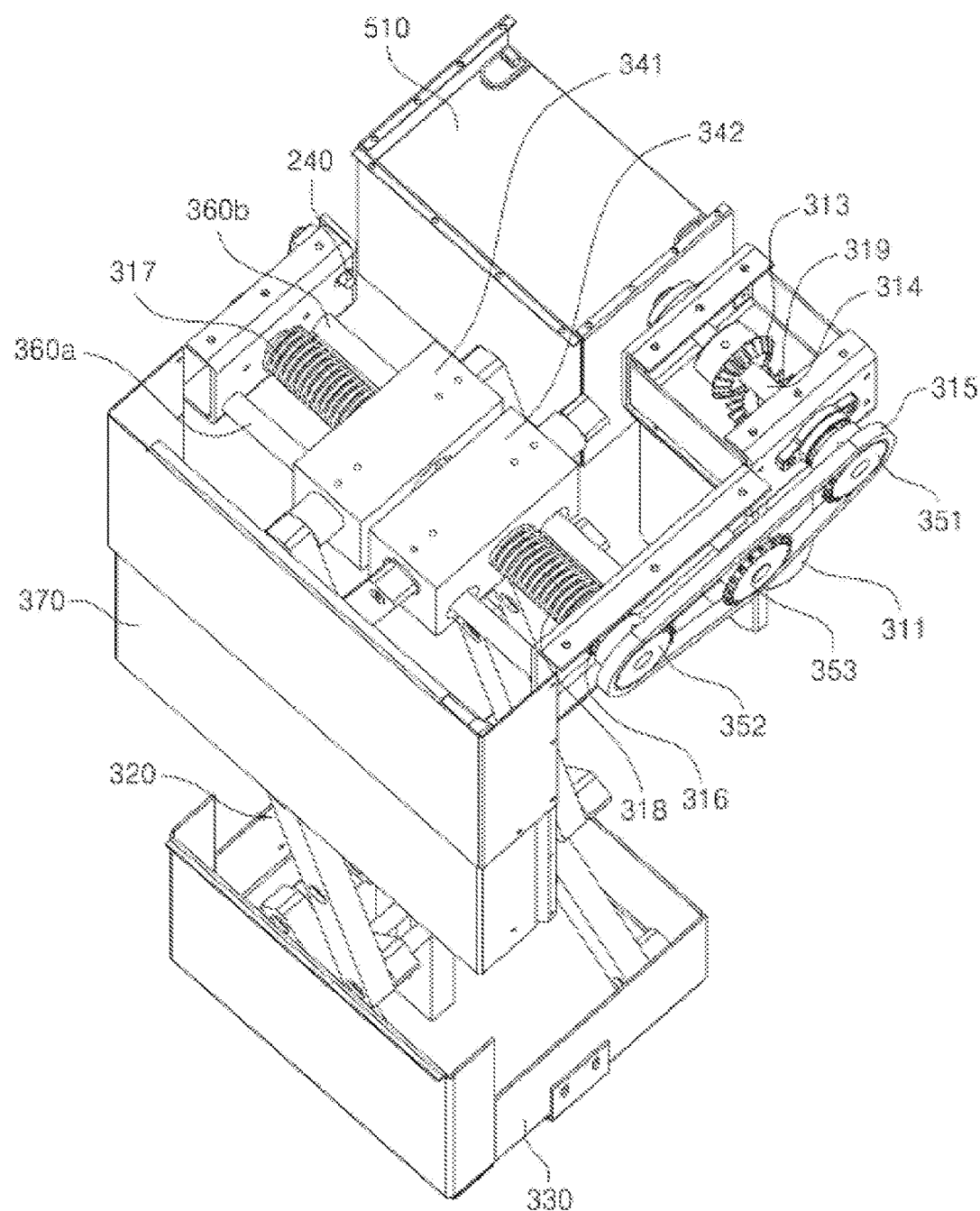
FIG. 8 is a perspective view showing a refuse compression unit of a refuse collection apparatus according to one embodiment of the present invention.
Figure 9:
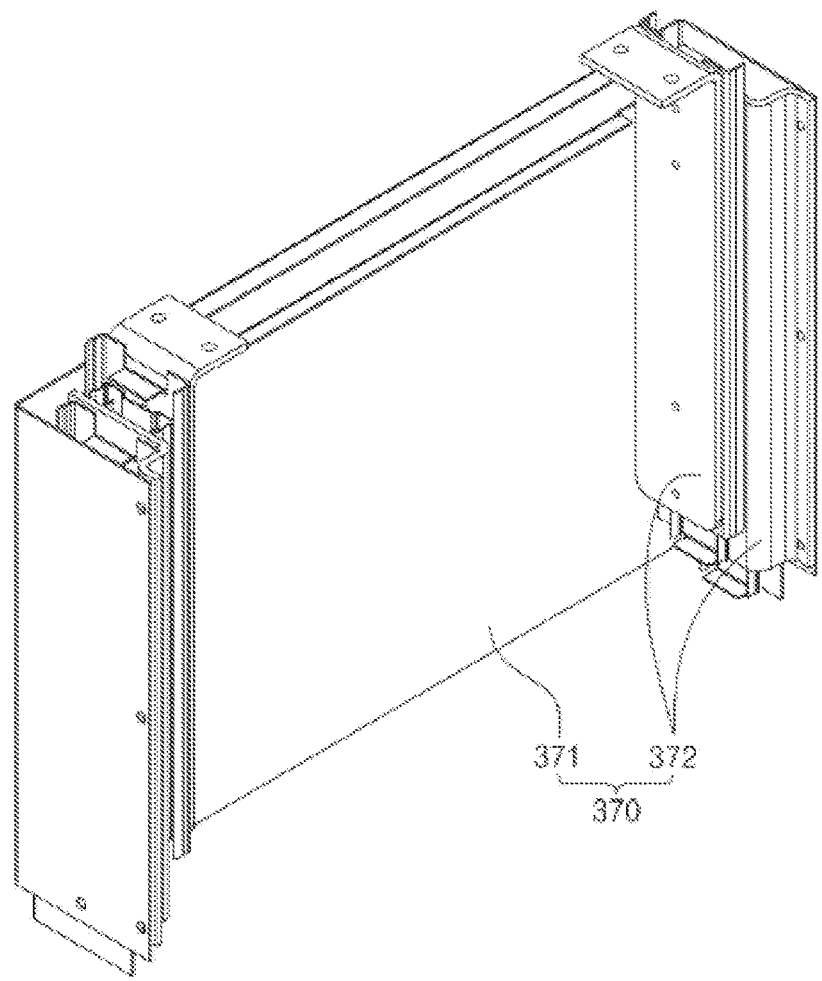
FIG. 9 is a perspective view showing a height regulation unit protection cover of a refuse collection apparatus according to one embodiment of the present invention.
Figure 10:
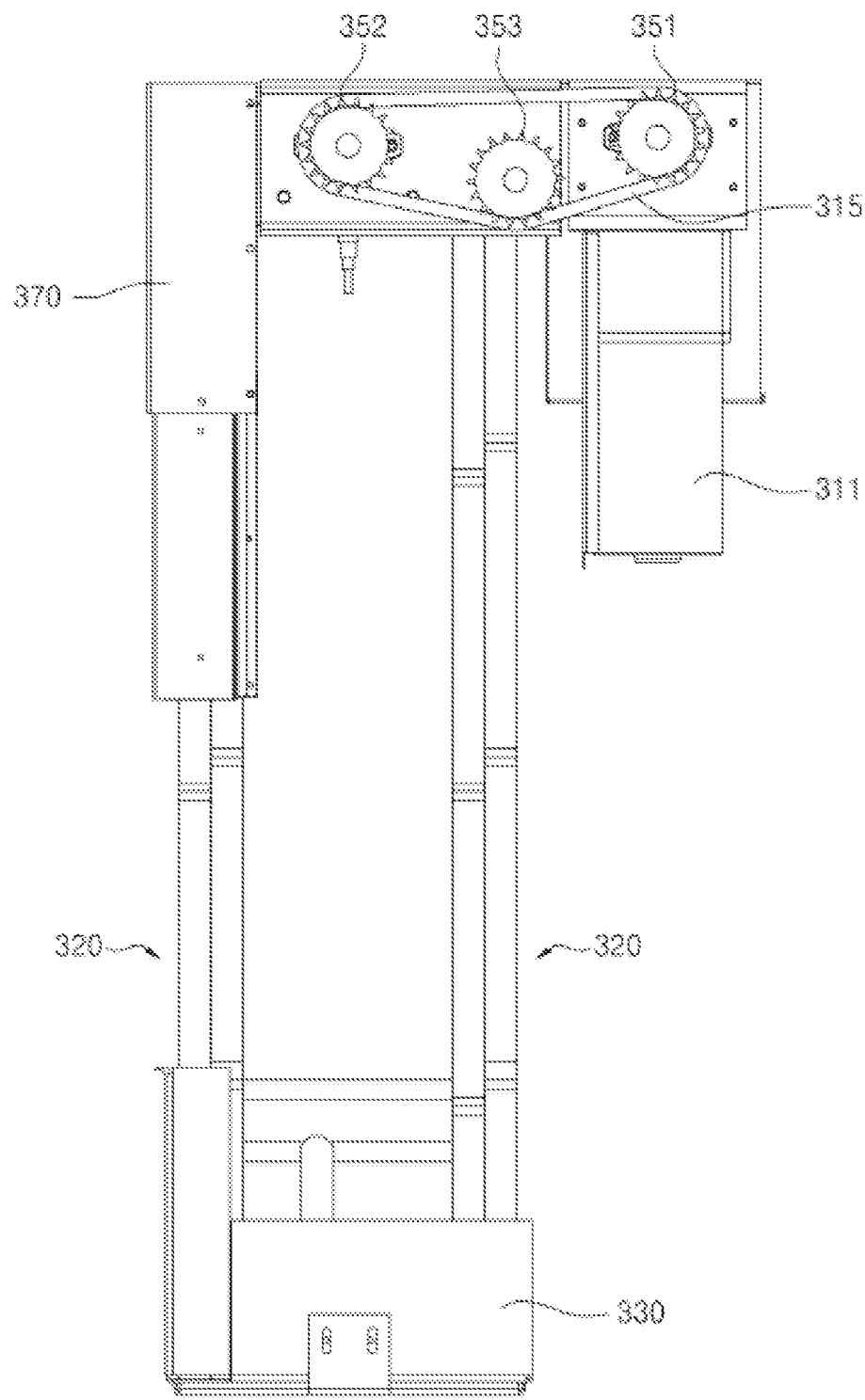
FIG. 10 is a cross-sectional diagram as seen from the side where a motor unit is located in a refuse collection apparatus according to one embodiment of the present invention.

FIG. 1 is a whole perspective view of a refuse collection apparatus according to one embodiment of the present invention, FIG. 2 is a partial disassembly perspective view showing the inside of a refuse collection apparatus according to one embodiment of the present invention, FIG. 3 is a cross-sectional diagram as seen from the front of a refuse collection apparatus according to one embodiment of the present invention, FIG. 4 is a cross-sectional diagram as seen from the back of a refuse collection apparatus according to one embodiment of the present invention, FIG. 5 is a cross-sectional diagram as seen from the side where a movement range detection unit is located in a refuse collection apparatus according to one embodiment of the present invention, FIG. 6 is a perspective view showing a driving unit of a refuse collection apparatus according to one embodiment of the present invention, FIG. 7 is a cross-sectional diagram as seen from the upper side of a refuse collection apparatus according to one embodiment of the present invention, FIG. 8 is a perspective view showing a refuse compression unit of a refuse collection apparatus according to one embodiment of the present invention, FIG. 9 is a perspective view showing a height regulation unit protection cover of a refuse collection apparatus according to one embodiment of the present invention and FIG. 10 is a cross-sectional diagram as seen from the side where a motor unit is located in a refuse collection apparatus according to one embodiment of the present invention.

Referring FIG. 1 and FIG. 2, a main body unit 200 may be arranged for a refuse to be inserted into, and various refuse such as a household waste, food waste or industrial garbage may be inserted into a main body unit 200.

Here, referring FIG. 2, a main body unit 200 may includes a main body 210 in which a refuse is inserted and accumulated and a main door 220 which is connected with a main body 210 and a refuse slot 221 is formed at, and further includes a refuse storage container 290.

Then, a refuse inserted through a refuse slot 221 of a main door 220 is stored to a refuse storage container 290 of the inside of a main body 210, and arranged in order to be compressed by a refuse compression unit 300 shown hereafter when a refuse of a certain range is accumulated.

Here, a refuse storage container 290 may be produced directly or may be arranged with an existing waste basket. And a refuse storage container 290 may be arranged in order to using a standard plastic garbage bag.

An existing waste basket, for example, various waste basket installed in a domestic or foreign (wheelie bin) public place may be inserted in the inside of a main body 210.

In this case, because the following refuse compression unit 300 compresses a refuse stored to a refuse storage container 290 while moving from an upper side of a refuse storage container 290 to a lower side of a refuse storage container 290, a refuse compression unit 300 may compress a refuse without a damage or breakdown of a refuse storage container 290 although an existing waste basket is used as a refuse storage container 290.

In other words, because a refuse collection apparatus according to one embodiment of the present invention may reuse an existing waste basket, a resource wasting and cost may be reduced.

Here, an ashtray 222 may be arranged in a lower side of a refuse slot 221 of a main door 220 and a ashtray guide plate (not shown) may be installed in a ashtray 222 so that a refuse inserted into a ashtray 222 easily moves to a refuse storage container 290.

And referring FIG. 2, a main body 210 may be connected with a main door opening and shutting detection unit 280 for detecting whether a main door 220 is opened or not.

Here, a main door opening and shutting detection unit 280 may includes a magnetic substance, and a main door 220 may includes a substance that responds to a magnetic substance such as an iron.

In other words, a main door opening and shutting detection unit 280 detects whether a main door 220 is opened or not through a magnetism change of a magnetic substance included in a main door opening and shutting detection unit 280.

Because a worker or user may be injured if a main door 220 is opened in the process of operating of a refuse compression unit 300, operating of a refuse compression unit 300 may be stopped when a main door opening and shutting detection unit 280 detects an opening of a main door 220.

Meanwhile, a main door opening and shutting detection unit 280 may be arranged with a photo sensor detecting a light reflected to a main door 220 after emitting a light.

Referring FIG. 2, a main body unit 200 may be connected with a power supply unit 500 supplying a power to a refuse compression unit 300. Here, a power supply unit 500 may supply a power not only to a refuse compression unit 300 but also to various detection units or sensors included in a refuse collection apparatus according to one embodiment of the present invention.

Here, a power supply unit 500 may be arranged in order to use a solar energy. In other words, a power supply unit 500 may include a charge battery 510 (referring to FIG. 4) installed in a main body unit 200 and a charge battery 510 may be connected to an electric wire to be charged from the outside or may be arranged in order to use a solar energy to be charged when a charge battery 510 is installed in a main body unit 200.

Referring FIG. 2 and FIG. 4, when a charge battery 510 is arranged in order to use a solar energy to be charged, a power supply unit 500 generates an electricity from a solar energy and uses a generated electricity to charge a charge battery 510 after receiving a solar energy through a solar energy reception plate installed in the upper side of a main body unit 200.

Here, a solar energy reception plate may be arranged in order to use at least one of a sunlight energy or solar heat energy.

Thereby, energy efficiency is improved and a wiring of inside main body unit 200 is facilitated.

However, a power supply unit 500 need not to include a charge battery 510 unconditionally, and a power supply unit 500 may be directly connected to an outside power supply terminal through a wire or may be directly connected to a solar energy reception plate without a charge battery 510 as necessary.

Meanwhile, a main body unit 200 may be connected with a communication unit 800, and a communication unit 800 may include at least one of a distance communication or short-haul communication.

Here, a communication unit 800 may transmit a state of a refuse collection apparatus 100 according to one embodiment of the present invention like a main body unit 200, refuse compression unit 300, movement range detection unit 400 or power supply unit 500 to an external server (not shown).

For example, a communication unit 800 transmits a related signal to an external server (not shown) when an accumulation amount of refuse in a main body unit 200 exceed a certain range for a main body unit 200 to be emptied and an administrator managing an external server (not shown) handles this.

Referring FIG. 3, a fire outbreak detection unit 250 may be installed in a main body unit 200 to detect whether a fire outbreaks or not.

For example, when a cigarette being lit is inserted into a main body unit 200 where combustible materials are stored in the inside of a main body unit 200 so that a fire outbreaks or when a main body unit 200 is heated by various reason so that a fire outbreaks with an explosion after a gas can enters the inside of a main body unit 200, a fire outbreak detection unit 250 detects it.

Then, a fire outbreak detection unit 250 may be arranged in order to raise an alarm when detecting an outbreak of fire and may transmit a state about an outbreak of fire to an external server (not shown) through above-mentioned communication unit 800.

Also, a sprinkler (not shown) or a powder spouting device (not shown) for extinguishing a fire is installed in the inside of a main body unit 200 and a sprinkler (not shown) or a powder spouting device (not shown) for extinguishing a fire may operate to extinguish a fire when a fire is detected by a fire outbreak detection unit 250

Here, a fire outbreak detection unit 250 may be arranged with a flame detection sensor detecting a flame through a wavelength of a flame when a fire outbreaks, may be arranged with a smoke detection sensor detecting a smoke when a fire outbreaks or may be arranged with a temperature detection sensor detecting a temperature when a fire outbreaks.

However, because a flame detection sensor, a smoke detection sensor or a temperature detection sensor is publicly known and such operation principle or structure is not main contents of the present invention, a further detail description about this is skipped.

Referring FIG. 2, an object detection unit 260 may be installed in the inside of a main body unit 200 in order to detect an object inserted from the outside of a main body unit 200.

In other words, as a refuse slot 221 may be formed at a main door 220, a hand of a worker or user may be inserted into the inside of a main body 210 through a refuse slot 221 without opening of a main door 220, at this time there is a risk of injury of a worker or user when a refuse compression unit 300 operates. So, an operation of a refuse compression unit 300 may be stopped when an object detection sensor 260 detects an object such as a hand of a worker or user.

Here, an object detection sensor 260 may be arranged with a photo sensor that is arranged as a pair, placed for heading an opposite direction and able to detect a light mutually radiated.

In other words, each photo sensors forming a pair is equipped with both of a light emitting unit and light receiving unit, placed in order to face each other at opposite side to radiate a light from each light emitting units and installed so that a light is received by a light receiving unit of the other photo sensor.

Here, when an object is inserted through a refuse slot 221, a light radiated at a light emitting unit is not able to be received by a light receiving unit with an obstruction of an object so a photo sensor may detect an object through whether a light is received by a light receiving unit.

Referring FIG. 1 and FIG. 2, an advertisement frame 230 may be connected with a main body unit 200. In other words, an advertisement frame 230 may provide various advertisements at a place where a refuse collection apparatus 100 according to one embodiment of the present invention is installed.

Here, an advertisement frame 230 may be simply inserted at one side of a main body unit 200 or may be embedded in one side of a main body unit 200 to be connected with a main body unit 200.

And when an advertisement frame 230 is embedded in one side of a main body unit 200, an advertisement frame 230 may be installed in order to be inserted into the inside of a main body unit 200 to prevent a direct contact with a rainwater or may be arranged in order to use a waterproof material such as rubber, urethane etc. to be sealed.

Also, an advertisement frame 230 prevents an advertisement frame itself from being robbed by a safety latch (not shown).

Here, an advertisement frame 230 may include LED (Light Emitting Diode) radiating a light for expressing an advertisement object more clearly. In other words, an advertisement frame 230 may use a LED to improve an advertisement effect even when the night grows late or a fog is formed.

And an advertisement frame 230 may include a LCD (Liquid Crystal Display) so an advertisement frame 230 may advertise not only still frame or image but also a moving image through a LCD.

Here, a LED or LCD may be supplied with a power from an above-mentioned power supply unit 500 using a solar energy to operate. And, a LCD may reproduce a moving image advertisement after a moving image advertisement is transmitted through an above-mentioned communication unit 800.

Referring FIG. 2, a refuse accumulation amount detection sensor 270 may be installed in the inside of a main body unit 200 for detecting an accumulation amount of a refuse inserted into the inside of a main body unit 200.

Here, a refuse compression unit 300 compresses a refuse when an accumulation amount of a refuse that exceeds a predetermined range is detected.

In other words, a refuse compression unit 300 may operate according to a detecting result of a refuse accumulation amount detection sensor 270.

Referring FIG. 3, a refuse accumulation amount detection sensor 270 may include a light emitting-light receiving unit 271 that is installed in one side of a main body unit 200 and able to emit and receive a light and a light reflection unit 272 that is installed in the other side opposite to a light emitting-light receiving unit 271 and reflects a light radiated from a light emitting-light receiving unit 271.

In other words, a light radiated from a light emitting-light receiving unit 271 is received by a light emitting-light receiving unit 271 after reflected by a light reflection unit 272 and a refuse compression unit 300 operates when a light is prevented from being received by a light emitting-light receiving unit 271 after an accumulation amount of a refuse exceeds a predetermined range.

However, a refuse accumulation amount detection sensor 270 may be arranged with a photo sensor that is arranged as a pair, placed for heading an opposite direction and able to detect a light mutually radiated in common with an object detection sensor 260.

Meanwhile, referring FIG. 2, a refuse compression unit manipulation button 223 may be installed in a main body unit 200, a refuse compression unit manipulation button 223 through which a worker compulsorily operates or stops a refuse compression unit 300.

Here, a refuse compression unit manipulation button 223 may be used when various detection units or sensors malfunctions or a refuse compression unit 300 needs to operate or be stopped according to the need.

Referring FIG. 3, a refuse compression unit 300 is installed in a main body 210 of a main body unit 200 and compresses a refuse inserted into the inside of a main body 210.

In other words, although a refuse is inserted into the inside of a main body 210 of a main body unit 200, because a volume and shape of a refuse is various so various porosity exists in the inside of a main body 210. Here, when a refuse storage container 290 is installed in the inside of a main body 210, a refuse is stored to a refuse storage container 290 so a refuse storage container 290 have various porosity.

Here, various porosities mean a space droplet percentage of a filling materials and an entire volume of a powder. The bigger porosity is, the lager an empty space between each refuses, so a use rate of space of the inside of a main body unit 220 decreases.

Therefore, it is possible that more refuses are inserted into the inside of a main body unit 200 when a refuse compression unit 300 compresses a refused for a porosity to decrease, through this, a cycle or time interval for emptying a main body unit 200 lessen so labor costs decrease and a possibility that a refuse is overflowed into the outside of a main body unit 200 also decreases.

Referring FIG. 3, a refuse compression unit 300 may include a compression plate 330, a height regulation unit 320 and a driving unit 310 to be formed.

A compression plate 330 may be connected with a height regulation unit 320 to move along up and down direction and to contact to a refuse so that a compression plate 330 may be arranged in order to compress a refuse. Here, a compression plate 330 may be combined only with a lower side of a height regulation unit 320 or may be combined in order to envelop a lower side of a height regulation unit 320 as shown in FIG. 3 or FIG. 4.

Also, a shape or size of a compression plate 330 may vary according to a shape or size of a main body unit 200, insert frequency of a refuse or a type of a refuse etc.

And a height regulation unit 320 may be connected with a compression plate 330 to regulate a height of a compression plate 330.

In other words, when a height regulation unit 320 operates in up and down direction, a compression plate 330 connected with a height regulation unit 320 is interlocked with an operation of a height regulation unit 320 to move in up and down direction, because a compression plate 330 may be connected with a lower side of a height regulation unit 320.

Here, a height of a compression plate 330 may be measured in upper direction from a bottom of a main body unit 200 or may be measured in lower direction from a height regulation unit 320 and a height of a compression plate 330 may be regulated by an operation of a height regulation unit 320.

And referring to FIG. 6 to FIG. 8, a driving unit 310 is connected with a height regulation unit 320 and provides a driving power to a height regulation unit 320. In other words, a driving unit 310 provides a driving power through which a height regulation unit 320 operates in up and down direction.

Here, a driving unit 310 may be arranged with various driving device, for example, a driving unit 310 may include a cylinder (not shown). Also, a driving unit 310 may include a driving motor 311. However, for convenience of description, a case that a driving unit 310 includes a driving motor 311 is illustrated in the following.

Referring a FIG. 6 and FIG. 7, a driving unit 310 may include a driving motor 311, a driving power transmission unit 312 and a rotation driving axis 316 to be formed.

A driving motor 311 is arranged in order to provide a driving power by a rotation and a driving motor 311 may be provided with a power supply from a power supply unit 500 using a above-mentioned solar energy to be able to operate.

Then, a driving power transmission unit 312 is connected to a driving motor 311 to transmit a driving power of a driving motor 311.

In other words, as a rotation driving axis 316 is connected with a driving power transmission unit 312, a driving power of a driving motor 311 is transmitted to a rotation driving axis 16 through a driving power transmission unit 312 to rotate a rotation driving axis 316 and a height regulation unit 320 operate in up and down direction by a rotation of a rotation driving axis 316.

Here, a driving power transmission unit 312 may include a bevel gear 313, a connection axis 314 and a belt unit 315 to be formed.

A bevel gear 313 may be arranged in order to be connected to a driving motor 311. In other words, a motor gear 319 is connected with a motor of a driving motor 311 and a bevel gear 313 is connected with a motor gear 319 with a certain angle about a motor gear 319.

A connection axis 314 is connected with a bevel gear 313, then a connection axis 314 rotates in a crossing direction with a motor axis of a driving motor 311.

Here, a belt unit 315 may be arranged in order to connect a connection axis 314 and a rotation driving axis 316. In other words, one side of a belt unit 315 may be connected with a connection axis 314 and the other side of a belt unit 15 may be connected with a rotation driving axis 316.

Then, when a connection axis 314 is rotated by a rotation of a driving motor 311, a rotation driving axis 316 connected with a belt unit 315 also may be interlocked with this to rotate.

Here, a belt unit 315 may be arranged with a chain belt, a connection axis may be connected with a main sprocket 351 for being connected to a chain belt and a rotation driving axis 316 may be connected with a transmission sprocket 352 for being connected to a chain belt in this case.

Also, referring FIG. 7, FIG. 8 and FIG. 9, a tension sprocket 353 may be disposed between a main sprocket 351 and transmission sprocket 352 for regulating a tension of a chain belt.

In other words, a connection of a main sprocket 351 and a transmission sprocket 352 may loosen when a main sprocket 351 is connected to a transmission sprocket 352 without disposal of a tension sprocket 353, so a tension sprocket 353 may be installed for regulating a tension of a chain belt to prevent this. Here, a position and the number of a tension sprocket 353 may be changed according to the need.

Meanwhile, referring FIG. 7 and FIG. 8, a first screw thread 317 and a second screw thread 318 may be formed around of a rotation driving axis 316.

A first screw thread 317 may be formed toward one side direction from a reference position, the reference position which is a pre-determined position of the rotation driving axis. Here, a reference position may be a center of a rotation driving axis 316.

Also a second screw thread 318 may be formed toward an opposite direction to a first screw thread from the reference position.

In other words, referring FIG. 7, a first screw thread 317 may be formed toward left side direction from a center of a rotation driving axis 316 and a second screw thread 318 may be formed toward right side direction from a center of a rotation driving axis 316.

Here, a screw thread may be connected with a guide block 340, so a first guide block 341 may be connected with a first screw thread 317 to move along a first screw thread 317 when a rotation driving axis 316 rotates and a second guide block 342 may be connected with a second screw thread 318 to move along a second screw thread 318 toward opposite direction about a moving direction of the first guide block 342.

In other words, because a first screw thread 317 and a second screw thread 218 is formed in order to head opposite direction each other, a first guide block 341 connected with a first screw thread 317 and a second guide block 342 connected with a second screw thread 318 move toward opposite direction each other when a rotation driving axis 316 rotates.

Here, referring FIG. 3 and FIG. 8, a height regulation unit 320 may include a first link unit 321 and a second link unit 322 to be formed. A first link unit 321 may be connected with a first guide block 341 and may be interlocked with a driving about left and right direction of a first guide block 341 to be driven in up and down direction, and a second link unit 322 may be connected with a first guide block 341 and may be connected with a second guide block 342 and be interlocked with a driving about left and right direction of a first guide block 342 to be driven in up and down direction.

In other words, a first link unit 321 and a second link unit 322 may be respectively connected by a hinge to be arranged as a link type in order to be able to be extended. Here, because terminals of a first link unit 321 and a second link unit 322 are respectively connected with each of a first guide block 341 and a second guide block 342, a first link unit 321 and a second link unit 322 connected to a hinge move in up and down direction when a first guide block 341 and a second guide block 342 move in left and right direction.

Whereby, it is possible for a height of a compression plate 330 connected with a lower side of a height regulation unit 320 to be regulated when a height regulation unit 320 is driven in up and down direction.

Referring FIG. 3, FIG. 8 and FIG. 10, a height regulation unit protection cover 370 may be connected with one side of a height regulation unit 320 for protecting a height regulation unit 320.

A height regulation unit protection cover 370 is arranged for protecting a height regulation unit 320 from a refuse etc. and also for preventing a hand of a worker or user inserted into the inside of a height regulation unit 320 from being injured while a height regulation unit 320 operates.

Here, referring FIG. 9, a height regulation unit protection cover 370 may include a cover plate 371 and sliding unit 372 to be formed.

A cover plate 371 may be arranged for covering a height regulation unit 320 and a sliding unit may be arranged for being combined whit a cover plate 371 to be able to slide.

In other words, a cover plate 371 combines with a sliding unit 372 and moves in up and down direction according to up and down driving of a compression plate 330 to cover a height regulation unit 320.

In FIG. 3, FIG. 8 and FIG. 10, a height regulation unit protection cover 370 and a compression plate 330 are discretely shown for a convenience of explanation but a height regulation unit protection cover 370 may be in contact with a compression plate 330 to be driven in up and down direction.

In other words, a cover plate 371 slides along a sliding unit 372 to move into a lower side through a self-weight of a cover plate 371 when a compression plate 330 is driven in a lower side and a cover plate 371 moves into upper side along a sliding unit 372 when a compression plate 330 is driven in upper side because a cover plate 371 in contact with a compression plate 330 be supplied with a power in upper direction by a compression plate 330.

Here, plurality of cover plates 371 and sliding units 372 may be arranged (referring FIG. 8 and FIG. 10), then a cover plate 371 and sliding unit 372 may be respectively connected with each other and are driven for corresponding to driving of a height regulation unit 320 to be hinged.

Meanwhile, referring FIG. 7 and FIG. 8, a horizontal bar 360 may be arranged for horizontally connecting a first guide block 341 and a second guide block 342. In other words, a first guide block 341 and a second guide block 342 are connected with a rotation driving axis 316 to move in left and right direction, however, it may not be easy to maintain level while moving in left and right direction.

For redeeming this, a horizontal bar 360 horizontally connects a first guide block 341 and a second guide block 342. In this case, a first guide block 341 and a second guide block 342 may move in left and right direction while maintaining level because a first guide block 341 and second guide block 342 move along not only a rotation driving axis 316 but also a horizontal bar 360.

Here, plurality of horizontal bars 360 may be arranged, for example two horizontal bars 360a, 360b are arranged to be installed alongside a rotation driving axis 316 in upper side or lower side of a rotation driving axis 316.

Referring FIG. 7 and FIG. 8, a sensor for ascending height regulation 240 is separately disposed from at least one of a first guide block 341 and second guide block 342 for controlling of ascending height of a compression plate 330 and may detect an approach of at least one of a first guide block 341 and second guide block 342.

In other words, in FIG. 7, a height regulation unit 320 moves to upper side and a compression plate 330 connected with a height regulation unit 320 also moves to upper side when a first guide block 341 moves to left side and a second guide block 342 moves to right side.

Here, if an upper side ascending height of a compression plate 330 is not limited, a compression plate 330 may keep on ascending to collide with a rotation driving axis 316, a first guide block 341 or second guide block 342.

For preventing this. An ascending of a compression plate 330 needs to be stopped when a compression unit 330 ascends up to predetermined range. Here, although various methods may be applied for stopping an ascending of a compression plate 330, a method through a sensor for ascending height regulation 240 is illustrated hereafter.

Referring FIG. 7, a sensor for ascending height regulation 240 may be arranged with a contact detection sensor detecting a contact of a first guide block 341 or second guide block 342 or an approach detection sensor detecting an approach distance of a first guide block 341 or second guide block 342.

In other words, in the case that a sensor for ascending height regulation 240 is arranged with a contact detection sensor, a driving of a first guide block 341 and second guide block 342 are stopped, thereby an ascending of a compression plate 330 is stopped when a first guide block 341 and second guide block 342 move in left and right direction to be in contact with a contact detection sensor.

Here, a contact detection sensor may be switched from a pressurizing force by a contact of a first guide block 341 or second guide block 342.

And in the case that a sensor for ascending height regulation 240 is arranged with an approach detection sensor, a driving of a first guide block 341 and second guide block 342 are stopped, thereby an ascending of a compression plate 330 is stopped when a first guide block 341 and second guide block 342 move in left and right direction to enter a detection range of an approach detection sensor.

Here, an approach detection sensor may be arranged with a photo sensor radiating a light to detect a reflected light.

Referring FIG. 5, a movement range detection unit 400 is disposed in the inside of a main body unit 200 to detect a movement range of a refuse compression unit 300.

And a movement range detection unit 400 may be arranged in order to calculate an accumulation amount of refuse compressed in a main body unit 200 through a moving distance of a height regulation unit 320 of a refuse compression unit 300 to a decompression position of a compression plate 330 of a refuse compression unit 300.

Referring FIG. 4 to illustrate this again, when a moving distance A of a height regulation unit 320 from an initial position X of a height regulation unit 320 to a final position Y of refuse compression is known, an accumulation amount B of compressed refuse may be calculated because an accumulation amount B of compressed refuse may be derived from a distance (X+Z=A+B) from a bottom Z of a main body unit 200 to an initial position X of a height regulation unit 320 and a difference (A+B−A=B) of a moving distance A of a height regulation unit 320.

For this, a movement range detection unit 400 may be arranged in order to detect a moving distance A of a height regulation unit 320 from an initial position X.

Here, referring FIG. 5, a movement range detection unit 400 may include a rotation plate 410 and rotation detection sensor 420 to be formed.

A rotation plate 410 may be connected with a rotation driving axis 316 and interlocked with a rotation of a rotation driving axis 316 to rotate.

As mentioned above, a driving power of a driving motor is transmitted to a rotation driving axis 316 through a driving power transmission unit 312 to rotate a rotation driving axis 316 then a height regulation unit 320 is driven in up and down direction by a rotation of a rotation driving axis 316.

Here, because a rotation plate 410 is connected with a rotation driving axis 316, a rotation plate 410 rotates together when a rotation driving axis 316 rotates, and a rotation angle of a rotation driving axis 316 is known when a rotation detection sensor 420 separately disposed from a rotation plate 410 detects a rotation of a rotation plate 410.

And a up and down moving distance of a height regulation unit 320 may be calculated when a rotation angle of a rotation driving axis 316 is known. In other words, a height regulation unit 320 moves in up and down direction as much as a distance corresponding to a circumference of a rotation plate 410 when a rotation plate 410 rotates 360 degrees.

Here, a rotation angle of a rotation driving axis 316 connected with a rotation plate 410 may be known through detecting a rotation angle by a rotation detection sensor 420 and an up and down moving distance of a height regulation unit 320 connected with a rotation driving axis 316 to be driven may be calculated through a rotation angle of a rotation driving axis 316.

As mentioned above, an up and down moving distance of a height regulation unit 320 is calculated so that an accumulation amount of a compressed refuse is calculated.

Meanwhile, if an accumulation amount of a compressed refuse is calculated by above-mentioned method, the accumulation amount may be displayed through a display unit 700 (referring FIG. 1).

Here, a rotation plate 410 may include a body board 411 on which a middle hole 416 is formed and a protrusion unit 412 equipped with a groove 413 and a protuberance 414 formed around the body board to be formed.

Referring FIG. 5, a middle hole 416 formed on a body board 411 may be connected with a rotation driving axis 316.

And a rotation detection sensor 420 is separately disposed with a predetermined distance from a rotation plate 410 to detect a rotation of a rotation plate 410 through a protrusion unit 412 of a rotation plate 410.

In other words, a groove 413 and a protuberance 414 of a protrusion unit 412 repeatedly pass through a rotation detection sensor 420 when a rotation plate 410 rotates. Here, because a rotation detection sensor 420 may be arranged in order to detect only a protuberance 414, a rotation angle of a rotation plate 410 may be calculated through a method multiplying an angle between a first protuberance 414a and a second protuberance 414b by a detecting number of protuberances 414.

Here, a rotation detection sensor 420 may be arranged with a magnetic sensor detecting a magnetic substance or a photo sensor detecting a light.

When a rotation detection sensor 420 is arranged with a magnetic sensor, a rotation plate 410 is arranged with a magnetic substance and a rotation detection sensor 420 detects a magnetism of a rotation plate 410.

Here, only protuberance 414 of a rotation plate 410 may be arranged with a magnetic substance or entire rotation plate 410 may be arranged with a magnetic substance. When entire rotation plate 410 is arranged with a magnetic substance, a rotation angle of a rotation plate 410 may be detected through a difference in magnetism according to a distance difference between a distance from a groove 413 to a magnetic sensor and a distance from a protuberance 414 to a magnetic sensor.

Also, a rotation plate 410 may be arranged with a substance that responds to a magnetic substance such as an iron and a rotation detection sensor 420 may include a magnetic substance to detect a protuberance 414 of a protrusion unit 412 through a magnetism change of a magnetic substance of a rotation detection sensor 420 when a rotation plate 410 rotates.

Meanwhile, a rotation detection sensor 420 may include a light emitting unit emitting a light and light receiving unit receiving a light that is emitted from a light emitting unit to be reflected by a rotation plate 410. In this case, a protuberance 414 may be detected through a time difference between a time when a light emitted from a light emitting unit is reflected by a groove 413 and a time when a light emitted from a light emitting unit is reflected by a protuberance 414.

Referring FIG. 2, a control unit 600 may measure a over-current flowing by overload applied to a driving motor 311 to control for removing a compression of a compression plate 330 when a compression plate 330 compresses a refuse by a driving power provided by a driving motor 311.

In other words, when a compression plate 330 pressurizes a refuse to compress a refuse then a refuse is compressed in excess of a certain range, a refuse is not compressed no more and at this time a reaction to a pressurizing force of a compression plate 330 may be transmitted to a driving motor 311 through a compression plate 330.

And, when a driving motor 311 continues to operate even though a reaction to a pressurizing force is applied to a driving motor 311, a driving motor 311 may be overloaded to be damaged or depredated so it needs to prevent this.

Here, if a driving motor 311 is overloaded by a reaction to a pressurizing force, over-current flows. When over-current generated by overload is measured, a control unit 600 controls in order to stop an driving of a compression plate 330, that is, an operation compressing a refuse by a compression plate 330.

In this case, tolerance range of over-current may be regulated through regulation of a variable resistance thereby a level of overload may be also regulated. In other words, regulating variable resistance, a level of over-current corresponding to overload when an operation of a compression plate 330 is stopped may be regulated.

Meanwhile, when a driving motor 311 is overloaded for over-current to be measured, a control unit 600 stops an operation of a compression plate 330 and computes a rotation number of a rotation plate 410 to a position where a compression of a compression plate 330 is removed.

Here, as mentioned above, a rotation angle of a rotation driving axis 316 may be known through a rotation number of a rotation plate 410 thereby a position of a height regulation unit 320 where a compression plate 330 removes a compression, in other words, up and down moving distance of a height regulation unit 320 may be calculated.

And a control unit 600 calculates up and down moving distance of a height regulation unit 320 from a position of a height regulation unit 320 where a compression plate 330 removes a compression, thereby calculates an accumulation amount of a compressed refuse in a main body unit 200.

In the following, a working and effect of compressing a refuse to prevent a refuse from being overflowed into the outside of an apparatus and of detecting a movement range of a refuse compression unit 300 to ascertain an accumulation amount of a refuse are illustrated in a refuse collection apparatus 100 according to one embodiment of the present invention.

Referring FIG. 1 to FIG. 10, there is effects that when a refuse inserted into the inside of a main body unit 200 exceeds a predetermined range, a refuse compression unit 300 compresses a refuse thereby a refuse is prevented from being overflowed into the outside of an apparatus.

In this case, when a driving motor 311 is overloaded by pressurizing of a refuse compression unit 300, a control unit 600 measures over-current by overload to control in order to stop a driving of a refuse compression unit 300.

Thereby there is an effect that a damage or breakdown of a driving motor 311 is prevented.

And there is an effect that a refuse compression unit 300 is connected with a movement range detection unit 400 to detect a movement range of a refuse compression unit 300, then an accumulation amount of a compressed refuse is calculated by a moving distance to a position where a compression of a refuse compression unit 300 is stopped thereby an accumulation amount of a refuse is ascertained.

In this case, an accumulation amount of a compressed refuse accumulated in the inside of a main body unit 200 may be externally displayed through a display unit 700.

Here, if an accumulation amount of a compressed refuse exceeds a certain range, information about an accumulation state of a refuse is transmitted to an external server (not shown) through a communication unit 800 then a worker receiving such information empties a main body unit 200.

Also, a fire outbreak detection unit 250 may be installed in the inside of a main body unit 200 and information about state of a fire outbreak may be transmitted to an external server (not shown) through a communication unit 800.

Meanwhile, a LED or an advertisement frame 230 that is able to advertise through LED may be installed in one side of a main body unit 200.

And a refuse collection apparatus 100 according to one embodiment of the present invention may be supplied with a power from a power supply unit 500 using a solar energy to operate.

The present invention is not limited to exemplary embodiments and it is obvious for those skilled in the art that the disclosure can be practiced with modifications in the spirit and scope of the appended claims. Accordingly, such modified embodiments are included in the spirit and scope of the appended claims

INDUSTRIAL APPLICABILITY

As the present invention relates to a refuse collection apparatus, especially, the present invention is applicable to an industrial related to a refuse collection.

ALTERNATIVE EMBODIMENTS

Alternative Embodiment 1

A storage container, comprising: a main body and a main door; a refuse slot formed at the main door and configured to receive refuse; a refuse storage container inside the main body configured to store the refuse or space within the main body for an external container to be inserted in; an ashtray; a solar energy reception plate; a power supply unit comprising a charge battery charged by solar energy received via the solar energy reception plate or from an external power source; a driving unit comprising a driving motor powered by the power supply unit; an electronic control unit powered by the power supply unit and configured to control operations of the storage container; a refuse compression unit installed in the main body and comprising a compression plate configured to compress the refuse stored in the refuse storage container; a sensor configured to detect whether the main door is open or closed; the refuse compression unit comprising a belt unit coupled to the driving motor via a rotation driving axis to cause the compression plate to move up and down relative to a height of the storage container during operation of the driving motor; a movement range detection unit comprising a rotation plate and a rotation detection sensor separately located from the rotation plate and configured to detect a rotation of the rotation plate, wherein the rotation plate is connected to the rotation driving axis, and wherein the rotation detection sensor comprises a photo sensor configured to detect a light or a magnetic sensor configured to detect a magnetic substance; and a communication unit powered by the power supply unit and configured to transmit wirelessly a state of the storage container to an external server.

Alternative Embodiment 2

The storage container of Alternative Embodiment 1, wherein the transmitted accumulation state of the refuse indicates that an accumulation amount of the refuse exceeds a certain range or another criterion.

Alternative Embodiment 3

The storage container of Alternative Embodiment 2, wherein the electronic control unit is configured to calculate the accumulation amount of the refuse.

Alternative Embodiment 4

The storage container of Alternative Embodiment 2, further comprising a refuse accumulation amount detection sensor installed inside the main body and configured to detect an accumulation amount of the refuse.

Alternative Embodiment 5

The storage container of Alternative Embodiment 1, wherein the ashtray is on the main door.

Alternative Embodiment 6

The storage container of Alternative Embodiment 1, wherein the ashtray is accessible from the main door.

Alternative Embodiment 7

The storage container of Alternative Embodiment 1, wherein the ashtray is separate from the main body.

Alternative Embodiment 8

The storage container of Alternative Embodiment 1, wherein the transmitted state of the storage container is a transmitted state of the main body and the main door.

Alternative Embodiment 9

The storage container of Alternative Embodiment 1, wherein the transmitted state of the storage container indicates whether the main door is opened or not.

Alternative Embodiment 10

The storage container of Alternative Embodiment 1, wherein the sensor configured to detect whether the main door is open or closed comprises a photo sensor configured to detect light.

Alternative Embodiment 11

The storage container of Alternative Embodiment 1, further comprising an advertisement frame attached to or embedded in the main body, the advertisement frame being configured to comprise an advertisement therein.

Alternative Embodiment 12

The storage container of Alternative Embodiment 1, further comprising a display device that displays an advertisement.

Alternative Embodiment 13

The storage container of Alternative Embodiment 12, wherein the display device is powered by the power supply unit.

Alternative Embodiment 14

The storage container of Alternative Embodiment 12, wherein the advertisement comprises a moving image.

Alternative Embodiment 15

The storage container of Alternative Embodiment 1, wherein the control unit is configured to stop an operation of the refuse compression unit in response to the sensor detecting an opening of the main door during operation of the refuse compression unit.

Alternative Embodiment 16

The storage container of Alternative Embodiment 1, wherein the state of the storage container comprises at least one of an accumulation state of the refuse, a state of the power supply unit, and other data detected by the sensor.

Alternative Embodiment 17

The storage container of Alternative Embodiment 1, further comprising a fire outbreak detection unit.

Alternative Embodiment 18

The storage container of Alternative Embodiment 17, wherein the fire outbreak detection unit is configured to detect a fire.

Alternative Embodiment 19

The storage container of Alternative Embodiment 17, wherein the fire outbreak detection unit is configured to detect an explosion.

Alternative Embodiment 20

The storage container of Alternative Embodiment 17, wherein the fire outbreak detection unit is installed in the main body.

Alternative Embodiment 21

A storage container, comprising: a main body and a main door; a refuse slot formed at the main door and configured to receive refuse; a refuse storage container inside the main body configured to store the refuse; a solar energy reception plate; a power supply unit comprising a charge battery charged by solar energy received via the solar energy reception plate; a driving unit comprising a driving motor powered by the power supply unit; an electronic control unit powered by the power supply unit and configured to control operations of the storage container; a refuse compression unit installed in the main body and comprising a compression plate configured to compress the refuse stored in the refuse storage container; a sensor configured to detect whether the main door is open or closed, the control unit stopping operation of the refuse compression unit in response to the sensor detecting an opening of the main door during operation of the refuse compression unit; the refuse compression unit comprising a belt unit coupled to the driving motor via a rotation driving axis to cause the compression plate to move up and down relative to a height of the storage container during operation of the driving motor; a movement range detection unit comprising a rotation plate and a rotation detection sensor separately located from the rotation plate and configured to detect a rotation of the rotation plate, wherein the rotation plate is connected to the rotation driving axis, wherein the rotation detection sensor comprises a photo sensor configured to detect a light or a magnetic sensor configured to detect a magnetic substance; a refuse accumulation amount detection sensor installed inside the main body and configured to detect an accumulation amount of the refuse; and a communication unit powered by the power supply unit and configured to transmit wirelessly an accumulation state of the refuse to an external server, the transmitted accumulation state of the refuse indicating that the detected accumulation amount of the refuse exceeds a criterion.

Alternative Embodiment 22

The storage container of Alternative Embodiment 21, further comprising an ashtray.

Alternative Embodiment 23

The storage container of Alternative Embodiment 22, wherein the ashtray is accessible from the main door.

Alternative Embodiment 24

The storage container of Alternative Embodiment 22, wherein the ashtray is separate from the main body.

Alternative Embodiment 25

The storage container of Alternative Embodiment 22, wherein the ashtray is arranged in the refuse slot.

Alternative Embodiment 26

The storage container of Alternative Embodiment 21, further comprising an advertisement.

Alternative Embodiment 27

The storage container of Alternative Embodiment 21, wherein the criterion is a certain range.

Alternative Embodiment 28

A storage container, comprising: a main body and a main door; a refuse slot formed at the main door and configured to receive refuse; a refuse storage container inside the main body configured to store the refuse; a solar energy reception plate; a power supply unit comprising a charge battery charged by solar energy received via the solar energy reception plate; a driving unit comprising a driving motor powered by the power supply unit; an electronic control unit powered by the power supply unit and configured to control operations of the storage container; a refuse compression unit installed in the main body and comprising a compression plate configured to compress the refuse stored in the refuse storage container; a sensor configured to detect whether the main door is open or closed, the control unit stopping operation of the refuse compression unit in response to the sensor detecting an opening of the main door during operation of the refuse compression unit; the refuse compression unit comprising a belt unit coupled to the driving motor via a rotation driving axis to cause the compression plate to move up and down relative to a height of the storage container during operation of the driving motor; a movement range detection unit comprising a rotation plate and a rotation detection sensor separately located from the rotation plate and configured to detect a rotation of the rotation plate, wherein the rotation plate is connected to the rotation driving axis, and wherein the rotation detection sensor comprises a photo sensor configured to detect a light or a magnetic sensor configured to detect a magnetic substance; and a communication unit powered by the power supply unit and configured to transmit wirelessly to an external server a state of the storage container, the state of the storage container comprising an accumulation state of the refuse and a state of the power supply unit.

Alternative Embodiment 29

The storage container of Alternative Embodiment 28, further comprising a refuse accumulation amount detection sensor installed inside the main body and configured to detect an accumulation amount of the refuse.

Alternative Embodiment 30

The storage container of Alternative Embodiment 29, wherein the transmitted accumulation state of the refuse indicates that the detected accumulation amount of the refuse exceeds a certain range or another criterion.

What is claimed is:
1. A storage container,
comprising: a main body and a main door;
a refuse slot formed at the main door and configured to receive refuse through the refuse slot;
a space within the main body configured to receive a refuse storage container therein to receive the refuse;
an ashtray;
a solar energy reception plate;
a power supply unit comprising a charge battery charged by solar energy received via the solar energy reception plate or from an external power source;
a driving unit comprising a driving motor powered by the power supply unit;
an electronic control unit powered by the power supply unit and configured to control operations of the storage container;
a refuse compression unit installed in the main body and comprising a compression plate configured to compress the refuse stored in the refuse storage container;
a door sensor configured to detect whether the main door is open or closed, the electronic control unit stopping operation of the refuse compression unit in response to the door sensor detecting an opening of the main door during operation of the refuse compression unit;

the refuse compression unit comprising a belt unit including a chain belt coupled to the driving motor via a rotation driving axis to cause the compression plate to move up and down relative to a height of the storage container during operation of the driving motor;

a movement range detection unit comprising a rotation plate and a rotation detection sensor separately located from the rotation plate and configured to detect a rotation of the rotation plate, wherein the rotation plate is connected to the rotation driving axis, and wherein the rotation detection sensor comprises a photo sensor configured to detect a light or a magnetic sensor configured to detect a magnetic substance;

a refuse accumulation amount detection sensor including a pair of photo sensors facing each other on opposite sides inside the main body so that a light transmitted by one of the pair of photo sensors is received by a light receiving unit of the other of the pair of photo sensors, wherein the refuse compression unit operates according to a detecting result of the refuse accumulation amount detection sensor;

a communication unit powered by the power supply unit and configured to transmit wirelessly to an external server (1) an accumulation state of the refuse in response to an accumulation amount of refuse in the refuse storage container exceeding a certain range or another criterion, (2) a state of the power supply unit, and (3) a state of the storage container; and a display unit powered by the power supply unit;

wherein the electronic control unit is configured to determine the accumulation amount of refuse based on a location of the refuse compression plate, and wherein the accumulation amount of the refuse is externally indicated by the display unit, wherein the rotation plate comprises (1) a body board on which a middle hole is formed and (2) a protrusion unit equipped with a groove and a protuberance formed around the body board, and wherein the rotation detection sensor detects a rotation of the rotation plate through the protrusion unit of the rotation plate to calculate the distance of the compression plate movement to determine the compression plate location.

2. The storage container of claim 1, wherein the ashtray is on the main door.

3. The storage container of claim 1, wherein the ashtray is accessible from the main door.

4. The storage container of claim 1, wherein the ashtray is separate from the main body.

5. The storage container of claim 1, wherein the transmitted state of the storage container is a transmitted state of the main body and the main door.

6. The storage container of claim 1, wherein the transmitted state of the storage container indicates whether the main door is opened or not.

7. The storage container of claim 1, wherein the door sensor comprises a photo sensor configured to detect light.

8. The storage container of claim 1, further comprising an advertisement frame attached to or embedded in the main body, the advertisement frame being configured to comprise an advertisement therein.

9. The storage container of claim 1, wherein the display unit displays an advertisement.

10. The storage container of claim 9, wherein the advertisement comprises a moving image.

11. The storage container of claim 1, wherein the electronic control unit is configured to stop an operation of the refuse compression unit in response to the door sensor detecting an opening of the main door during operation of the refuse compression unit.

12. The storage container of claim 1, further comprising a fire outbreak detection unit.

13. The storage container of claim 12, wherein the fire outbreak detection unit is configured to detect a fire.

14. The storage container of claim 12, wherein the fire outbreak detection unit is configured to detect an explosion.

15. The storage container of claim 12, wherein the fire outbreak detection unit is installed in the main body.

16. The storage container of claim 1, wherein the ashtray is arranged in the refuse slot.

* * * * *